(No Model.)

R. S. WARING.
MANDREL FOR CABLE PRESSES.

No. 294,547. Patented Mar. 4, 1884.

Witnesses.
Darwin S. Wolcott
R. H. Whittlesey

Inventor.
RICHARD S. WARING
BY ATTORNEY
George H. Christy

UNITED STATES PATENT OFFICE.

RICHARD S. WARING, OF PITTSBURG, PENNSYLVANIA.

MANDREL FOR CABLE-PRESSES.

SPECIFICATION forming part of Letters Patent No. 294,547, dated March 4, 1884.

Application filed September 27, 1883. (No model.)

*To all whom it may concern:*

Be it known that I, RICHARD S. WARING, a citizen of the United States, residing at Pittsburg, county of Allegheny, State of Pennsylvania, have invented or discovered a new and useful Improvement in Mandrels for Cable-Presses; and I do hereby declare the following to be a full, clear, concise, and exact description thereof, reference being had to the accompanying drawings, making a part of this specification, in which—like letters indicating like parts—

Figure 1:
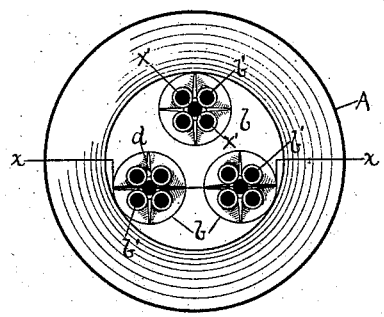
Figure 2:
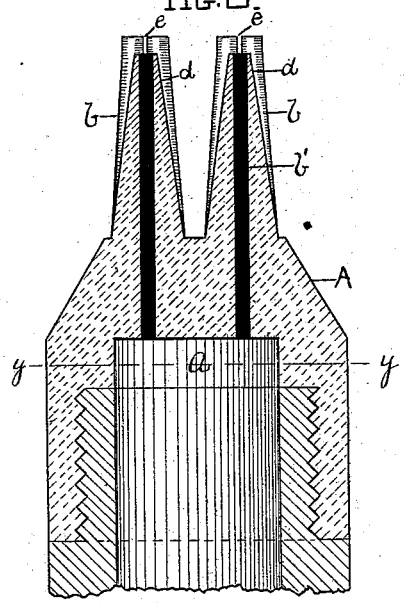
Figure 3:
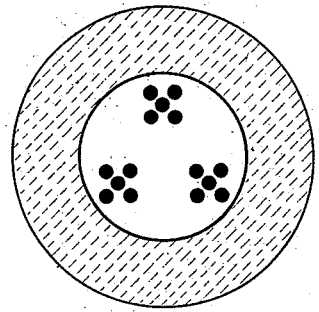
Figure 4:

Figure 1 is an end view of my improved mandrel, looking upon the nipples or point of the same. Fig. 2 is a longitudinal section on the line $x\,x$, Fig. 1. Fig. 3 is a transverse section on the line $y\,y$, Fig. 2. Fig. 4 is a longitudinal section of one of the nipples on the line $x'\,x'$, Fig. 1.

Electric cables of the class to which the present invention relates are composed of a body of soft metal, lead being preferred, through which are formed a number of small passages inclosing the insulated conducting-wires. It is essential to this class of cables that each of the wires should be completely surrounded by their walls of metal, which not only neutralize or prevent injurious effects of electrical induction, but also protect the wires and their insulating-covering from all access of moisture or other injurious agencies. In addition to the thin covering which will accomplish the above-named results, the cables must have sufficient body of metal to protect the wires from external injury and render the same strong and durable. It is necessary, therefore, to surround the wires forming the cable with a much thicker wall than is necessary between the wires themselves.

The object of my present invention is to provide for making a cable having such features of construction; and it consists of a mandrel having wire-passages through the same, with longitudinal grooves in its outer surface, between the wire-passages, extending to the point, with narrow channels cut between the passages for the outside wires, and having the walls of the passages for the outside wires raised above the wall of the passage for the central wire.

My improved mandrel is formed of a tapering body of steel or other suitable metal, A, having in its base a threaded socket, $a$, for attaching it to the tubular core-bar D of a press. On the end of this tapering body A are formed three teats, $b$, through which and the tapered body are drilled five separate passages or holes, $b'$, the four outside passages being arranged in a position corresponding to the angles of a square, the central passage being located at the intersection of the diagonals of this square. These passages at their inner ends communicate with the axial socket $a$. Along the tapering sides of the teats $b$ and between the wire-passages $b'$ are cut grooves $d$, which extend to the point of the teats. The wall of the central passage does not extend to the same height as the walls of the outer passage; and there is thus formed a recess, $f$, in the end of the teat, which recess is connected with the external grooves, $d$, by narrow channels $e$, cut in the walls connecting the adjoining nipples. The grooves $d$ direct the flow of lead into the outer spaces between the outside wire-passages, and the channels $e$ afford passages through which the lead can flow from the grooves $d$ around the inside spaces of the outer wire-passages and against the central wire.

It will be seen that in the above-described construction the lead is forced against the central wire with equal pressure on all sides, and that therefore a central nipple is not necessary to support and hold the central wire in place, it not being subjected to any unequal pressure. By omitting this central nipple I am enabled to arrange all the wires in much closer proximity than if a nipple for the central wire were used, for in the latter construction the nipples for the outside wires would have to be sufficiently removed from the central nipple to allow of the formation of grooves between these outside and central nipples for the flow of lead around the central nipple, and as a consequence of this spreading of the nipples the walls of lead between the wires of the cable would be much thicker than is necessary to prevent induction and to effect a complete sealing of the wires, and the cable would be therefore much heavier and less flexible.

It will be further observed that by the relative arrangement of the wire-passages, combined with the side grooves, $d$, and the channels $e$, almost all of the nipple around each outside wire is exposed to the direct contact and pressure of the lead as it flows upon the exterior surface, and that the lead is formed into tube-like inclosures around the outside wires before it leaves the mandrel, thereby preventing undue pressure of the lead upon the wires, which, if too great, would cause injury by stripping off or breaking the insulating-covering of the wires. It is not necessary to so protect the central wire, as it is in a great degree protected from the pressure of the lead by the surrounding nipples.

The thickness of metal covering forming the exterior of the cable may be determined in the usual way by the size and adjustment of the die-opening through which the wires pass in leaving the mandrel, and within which the lead is applied to the wires as practiced in the art.

I have shown herein a mandrel having three teats for forming three cables simultaneously; but I do not claim such a mandrel herein, the same being the subject-matter of another application for a patent.

I claim herein as my invention—

1. A mandrel, A, for a cable-press, having a teat or projection on its end, with separate wire-passages through both the mandrel and teat, the outside wire-passages extending beyond the central wire-passage, the teat having the longitudinal grooves $d$ extending between the outside wire-passages to the point, and having the channels $e$ connecting the grooves with the central recess, $f$, substantially as set forth.

2. A mandrel, A, for a cable-press, having a tapered body and a teat or projection on its end, with five separate wire-passages through both the tapered body and teat, and arranged in positions corresponding to the intersection and ends of the diagonals of a square, the teat having grooves $d$ extending between the outside wire-passage to the point, the channels $e$ connecting the grooves with the recess $f$, and the central recess, $f$, in its end, substantially as set forth.

In testimony whereof I have hereunto set my hand.

RICHARD S. WARING.

Witnesses:
D. S. WOLCOTT,
R. H. WHITTLESEY.